United States Patent [19]
Castelaz

[11] Patent Number: 5,454,064
[45] Date of Patent: Sep. 26, 1995

[54] SYSTEM FOR CORRELATING OBJECT REPORTS UTILIZING CONNECTIONIST ARCHITECTURE

[75] Inventor: Patrick F. Castelaz, Yorba Linda, Calif.

[73] Assignee: Hughes Aircraft Company, Los Angeles, Calif.

[21] Appl. No.: 796,288

[22] Filed: Nov. 22, 1991

[51] Int. Cl.⁶ .............................. G06F 15/16; G06F 15/18
[52] U.S. Cl. .................... 395/21; 395/24; 395/23
[58] Field of Search .................... 395/22–25, 27, 395/94, 3; 364/820

[56] References Cited

U.S. PATENT DOCUMENTS

| | | | |
|---|---|---|---|
| 4,748,674 | 5/1988 | Freeman | 382/14 |
| 4,803,736 | 2/1989 | Grossberg et al. | 395/25 |
| 4,804,250 | 2/1989 | Johnson | 395/25 |
| 4,884,216 | 11/1989 | Kuperstein | 395/94 |
| 4,930,099 | 5/1990 | Castelaz | 364/820 |
| 5,001,631 | 3/1991 | Castelaz | 395/22 |
| 5,077,677 | 12/1991 | Murphy et al. | 395/3 |
| 5,170,463 | 12/1992 | Fujimoto et al. | 395/27 |
| 5,210,798 | 5/1993 | Ekchian et al. | 395/22 |
| 5,315,562 | 5/1994 | Bradley et al. | 367/89 |
| 5,323,470 | 6/1994 | Kara et al. | 382/1 |

OTHER PUBLICATIONS

U.S. Patent Application, entitled "Neural Engine", Filed Jun. 6, 1990, Ser. No. 07/534,211, Inventors: Henrikson et al.
"An Introduction to Computing with Neural Nets", by Richard Lippmann, *IEEE ASSP Magazine*, Apr. 1987, pp. 4–22.
"Optimization by Simulated Annealing", by S. Kirkpatrick, C. D. Gelatt, Jr., M. P. Vecchi, *Science*, 13 May 1983, pp. 671–680, vol. 220.

*Primary Examiner*—Robert W. Downs
*Assistant Examiner*—Tariq Hafiz
*Attorney, Agent, or Firm*—Wanda K. Denson-Low

[57] ABSTRACT

A correlation processor (22) for solving large correlation problems involving multi-dimensional data (12, 16, 20). The system correlates vectors in a first set with vectors in a second set. The system includes a plurality of input devices (24) for accepting the entities (16) in the second set of data (14). Also, a set of processing elements (26) are included for producing a correlation output signal that is a first predetermined function of its inputs. A set of variable strength interconnections (28) couple each of the input devices (24) to each of the processing elements (26) through a connection having a strength that is a second predetermined function of the first set of multi-dimensional data (12), wherein the weighted connection (28) to each processing element (26) is proportional to one of the entities in the first set of multi-dimensional data. A controller (48) is provided for assigning each of the entities (16) in the second set (14) to one of the entities in the first set based on a comparison of the correlation signals from the processing element (26). The system requires minimal algorithm development, minimal software development and minimal preprocessing. It can be implemented using current hardware technology at a reasonable cost to provide real-time solution to multi-dimensional correlation problems.

9 Claims, 3 Drawing Sheets

TRACK CORRELATION (T/C) FILE ~50

AFTER PROCESSING:

| SYSTEM TRACK No. | MAX-MATCH MAX[C(K)] | PLOT No. |
|---|---|---|
| 1 | MAX[C(1)] ★ | 4 |
| 2 | MAX[C(2)] | 9 |
| 3 | MAX[C(3)] | 22 |
| 4 | MAX[C(4)] | 1 |
| 5 | MAX[C(5)] | |
| j | MAX[C(j)] | k |
| N | MAX[C(N)] | m |

★ e.g., MAX[C(1)] VALUE TO-DATE

Fig-4

HOST PROCESSING  ← 48

FOR EACH PLOT VECTOR PRESENTED TO CAPT.

1. RETRIEVE ALL C(k)'s
2. FIND MAX C(k). CALL IT D(k)
3. COMPARE D(k) WITH CURRENT C(k) IN T/C FILE
4. IF D(k) > C(k) THEN REPLACE C(k)
   —ALSO REPLACE OLD PLOT No. WITH NEW
5. REPEAT PROCESS FOR NEXT PLOT VECTOR

Fig-3

SYSTEM FOR CORRELATING OBJECT REPORTS UTILIZING CONNECTIONIST ARCHITECTURE

BACKGROUND OF THE INVENTION

1. Technical Field

This invention relates to correlation processors, and more particularly to a connectionist architecture for correlating entities in a first set of multi-dimensional data with entities in a second set of multi-dimensional data.

2. Discussion

A wide variety of data processing tasks involve solving correlation problems. Generally, correlation problems involve the correlation, or assignment, of elements in one set of data to elements in another set of data. Correlation problems are present in applications including radar/sonar/IR target identification, machine inspection, medical, or financial pattern recognition tasks.

Correlation problems are often difficult to solve because there may not be a single solution, but instead there may be a range of solutions over which the best solution is sought. Also, these problems frequently involve a combinatorial "explosion", or exponential blow-up in the number of possible answers. Many of the current approaches to solving these problems have a number of drawbacks. One difficulty is in developing algorithms and software, which can take a great deal of time and resources. In addition, software approaches are extremely CPU intensive for problems involving large numbers of data elements and high dimensionality data. Conventional approaches are simply not feasible for real-time or near real-time solutions.

An alternative approach involves the use of connectionist or neural network architectures. Connectionist architectures generally refers to systems which involve massively connected, fine-grained processing elements. Neural networks are connectionist architectures which are so named because of their similarity to biological networks in their highly interconnected structure and in their ability to adapt to data and exhibit self-learning. These approaches have the advantage of operating without requiring the development of an explicit algorithm and software. For example, see U.S. Pat. No. 4,660,166, issued to J. Hopfield, where a type of neural network is used to solve association problems, such as the traveling salesman problem. Another related technique is known as simulated annealing. See S. Kirkpatrick, Gelatt, and Vecchi: "Optimization By Simulated Annealing" 220 SCIENCE, pages 671–680 (1983).

Unfortunately, while slow, software simulations of connectionist architectures have been developed, practical high-density hardware embodiments taking fully advantage of the inherent parallelism of these systems have not yet been perfected. Also, neural networks, such as the one described in U.S. Pat. No. 4,660,166 are generally not fast enough for real-time application for high-dimensionality data association for a large numbers of data elements. For example, the system in that patent is not able to solve the traveling salesman problem for significantly more than 30 cities.

Thus, it would be desired to provide an information processor which can provide real-time solutions to multi-dimensionality correlation problems involving a large number of data elements. Further, it would be desirable to provide such an information processor which requires minimal algorithm development, minimal software development, and minimal preprocessing. Further, it would be desirable to provide such an information processor which can be implemented using current hardware technology at a reasonable cost.

SUMMARY OF THE INVENTION

In accordance with one aspect of the present invention, a system is provided for producing a correlation between entities in a first set of multi-dimensional data, with entities in a second set of related multi-dimensional data. The system includes a plurality of input devices for accepting the entities in the second set of data. Also, a set of processing elements is included for producing a correlation output signal that is a first predetermined function of its inputs. A set of variable strength interconnections couple each of the input devices to each of the processing elements through a connection having a strength that is a second predetermined function of the first set of multi-dimensional data, wherein the weighted connection to each processing element is proportional to one of the entities in the first set of multi-dimensional data. Also, a controller means is provided for assigning each of the entities in the second set to one of the entities in the first set based on a comparison of the correlation signals from the processing elements.

In accordance with another aspect of the present invention, a method is provided for correlating entities in a first set of multi-dimensional data with entities in a second set of related multi-dimensional data, the method comprising the steps of: receiving the entities in said second set of data in an input means; providing a processing element capable of producing correlation output signals that are a first predetermined function of their inputs; providing a set of variable strength interconnections coupling each of said input means with each of said processing elements through a connection having a strength that is a second predetermined function of said first set of multi-dimensional data, the weighted connection to each processing element being proportional to one of the entities in the first set of multi-dimensional data; and assigning each of the entities in the second set to one of the entities in the first set based on a comparison of the correlation signals from the processing elements.

BRIEF DESCRIPTION OF THE DRAWINGS

The various advantages of the present invention will become apparent to those skilled in the art after reading the following specification and by reference to the drawings in which:

FIG. 3 is a flow chart of the steps performed by the host processor in accordance with a preferred embodiment of the present invention; and FIG. 4 is a diagram of a Track Correlation File in accordance with a preferred embodiment of the present invention.

DESCRIPTION OF THE PREFERRED EMBODIMENTS

In accordance with the teachings of the present invention, a system and method is provided for solving large correlation problems involving multi-dimensional data. This system and method will be explained through the example of a system adapted for plot-to-track correlation. It will be appreciated that this preferred embodiment is but one example of the possible applications in which the system and method of the present invention can be employed.

Figure 1:
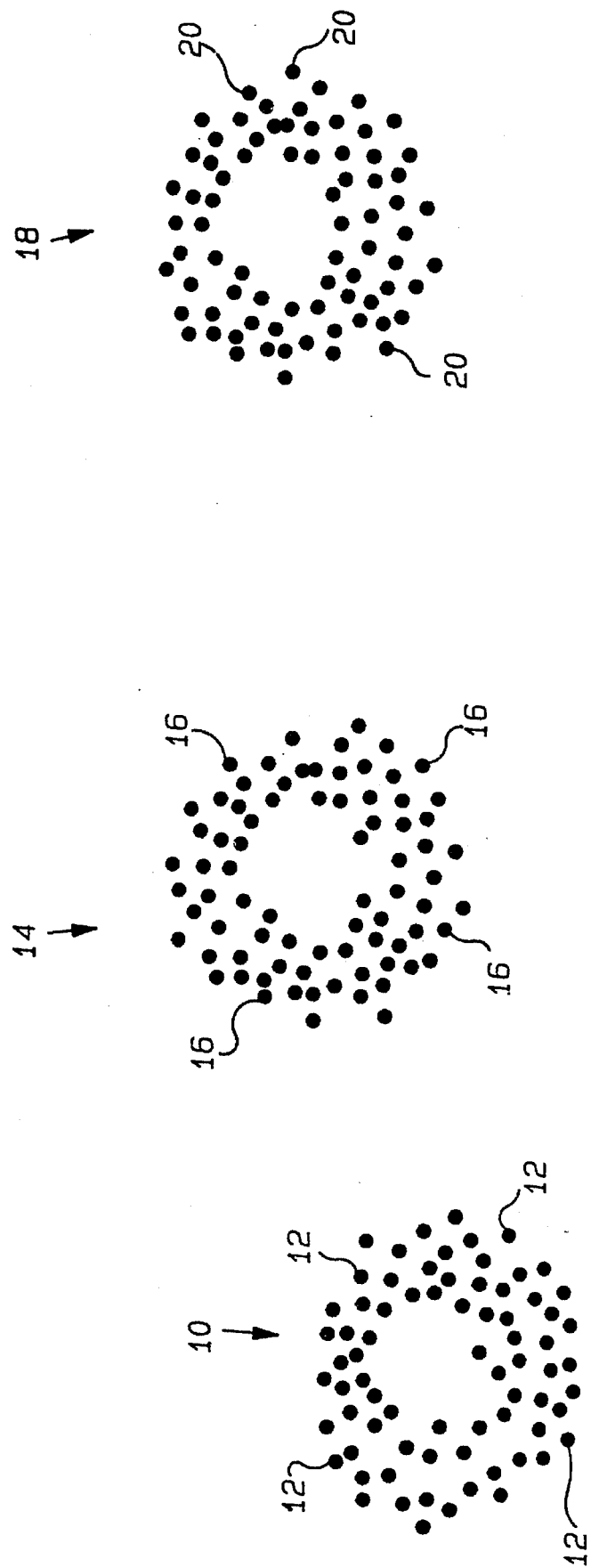
FIG. 1 is a diagram of a plot-to-track correlation problem to be solved in accordance with a preferred embodiment of the present invention.

Referring now to FIG. 1, a diagram of a plot-to-track problem is shown. This problem involves tracking moving airborne objects based on information about their positions as well as other information such as their velocity. The overall problem involves correlating a first group 10 of object reports 12 with a second group 14 of object reports 16. In addition, a third group 18 of object reports 20 are shown. Groups 10, 14 and 18 represent data gathered from the same group of objects at successive and equal intervals of time. The essence of the problem is that based on the information available one does not know which object report in a particular group corresponds with given object reports in previous or successive groups. For example, it is often desirable to determine a one to one correlation between object reports 16 in the second group 14 with object reports 12 in the first group 10.

Once information about such object reports (plots) at different time frames are received, a tracking system can begin to make predictions about the location of objects in future time frames. This prediction may be based on different kinds of information about the objects such as the trajectories of objects from one time frame to another. Also, the relative position of an object within a group is useful to predict where the object will be located within the group at a future time frame. Information about the velocity of the object is sometimes available to make these predictions also.

In any event, once these predictions, called "system tracks" have been made, it is desirable to correlate the predicted object locations with new object reports (plots). That is, the task is to find a one-to-one correspondence between N system tracks (predicted locations) and in N object reports (plots). Of course, if the predictions were all perfect, the object report locations would all match the system tracks perfectly. However, in real systems, there will be errors in predictions, as well as measurement errors, so the predictions will not generally match the object report locations. However, it can be assumed that the object reports which are closest to the system tracks are likely to be the objects for which the system track corresponds. Therefore, the task of the present invention in its preferred embodiment is to find the object reports which are closest to each system track. Of course, it will be appreciated that "close" in this context refers to close in M-dimensional data space and not simply physically close. For example, where velocity information is known about each object report, the present invention will match object reports to system tracks which have minimum differences between vectors which define both position and velocity.

It should also be noted that where there are large numbers of object reports (plots) and system tracks, such as 1,000, the problem of calculating all the vector differences and finding the minimum differences becomes extremely computationally intensive. For example, to sequentially compute plot-to-track correlations for 1,000 M-dimensional plots and 1,000 M-dimensional system tracks, would require $10^6 M$ computations for each plot-to-track correlation measurement (correlation factor). In realtime systems where the entire calculation must be accomplished in much less than a second, sequential processing is not a practical alternative. As a result, the present invention utilizes a massively parallel connectionist architecture to perform the calculations.

Figure 2:
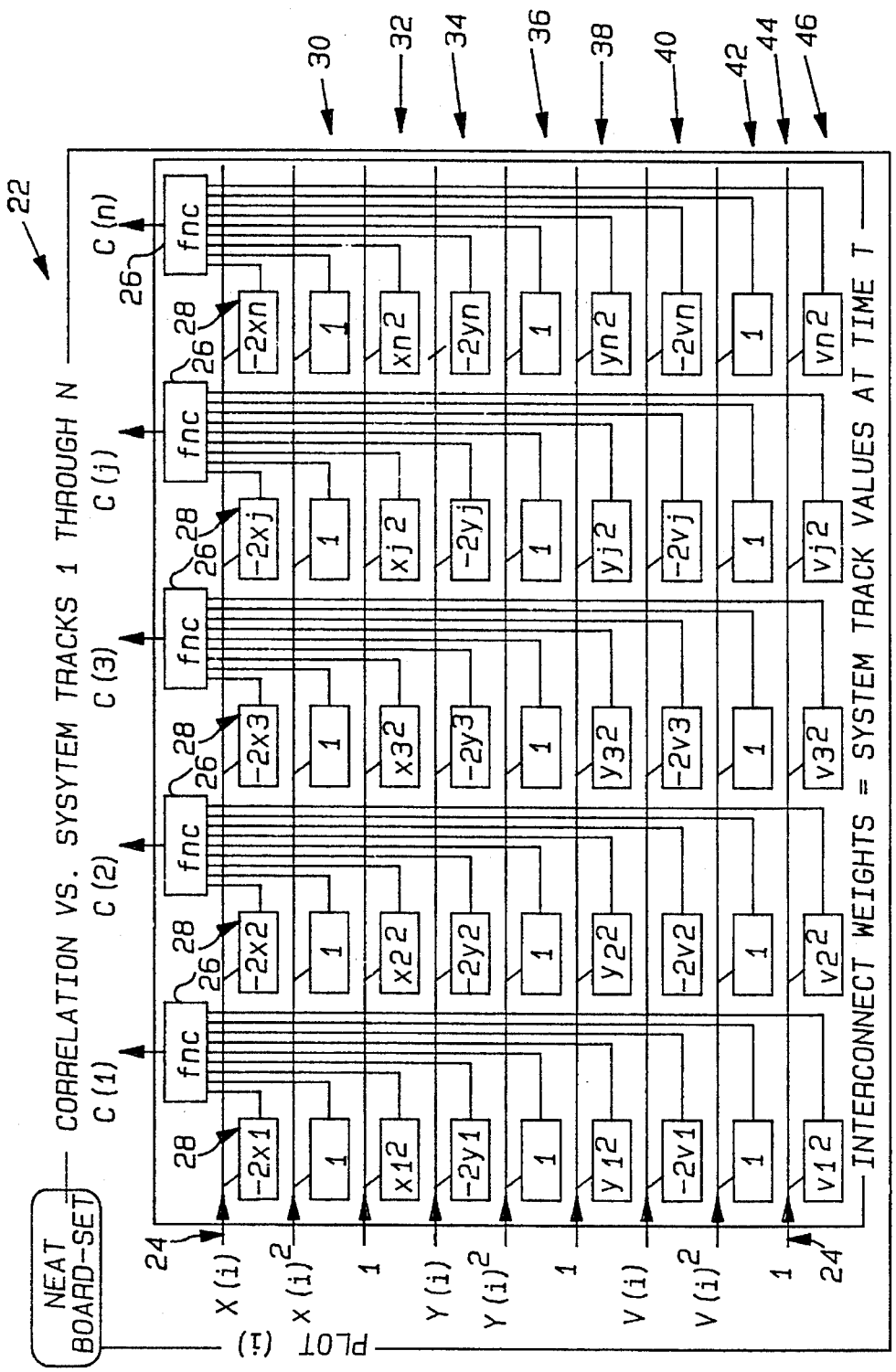
FIG. 2 is a diagram of a correlation processor in accordance with a preferred embodiment of the present invention.

In more detail, referring now to FIG. 2, a connectionist architecture for plot-to-track correlation (CAPT) 22 is shown. The CAPT 22 is related to fundamental multi-layer neural network structures such as the perceptron described in the article, Richard P. Lippman, "An Introduction To Computing With Neural Nets", IEEE ASSP Magazine, April, 1987, Pg. 4, which is hereby incorporated by reference. However, unlike conventional perceptrons, in which internal weights are adapted during training, the CAPT 22 is a fixed weight network in which system tracks are represented as interconnect weights in the multi-layer processing structure. As shown in FIG. 2, the CAPT system 22 includes a plurality of input lines 24, each of which are connected to each of a plurality of output processing elements 26 through weighted interconnections 28.

A basic function of the CAPT 22 is to compute distances between points in multi-dimensional space. For example, the data points may comprise three dimensional data for individual object reports comprising x, y and v values. In this case, where x and y are coordinate locations and v is a velocity such as a Doppler radar data value. Where it is desired to find the best correlation (minimum vector distance) between object reports and system tracks, the task will be to find the difference between system track vector $x(j)$, $y(j)$, $v(j)$ at time T and the plot vector $x(i)$, $y(i)$, $v(i)$ at time T. The difference Z between these two vectors can be expressed as:

$$Z=[x(i)-x(j)]^2+[y(i)-y(j)]^2+[v(i)-v(j)]^2 \quad (1)$$

where $$[x(i)-x(j)]^2=x(i)^2+x(j)^2-2x(i)x(j)$$

$$[y(i)-y(j)]^2=y(i)^2+y(j)^2-2y(i)x(j) \text{ and}$$

$$[v(i)-v(j)]^2=v(i)^2+v(j)^2-2v(i)v(j).$$

To rapidly compute these distances the CAPT 22 incorporates the polynomial factors in these expressions as weights. Thus, the $-2x(j)$ factors are incorporated as weights in the first row 30; the 1 factor is incorporated as the second row 32; the $x(j)^2$ factor is incorporated as the third row weights 34; the $-2y(j)$ factor becomes the fourth row weights 36; the 1 factor becomes the fifth row weights 38; the $y(j)^2$ factor becomes the sixth row weights 40; the $-2v(j)$ factor becomes the seventh row weights 42; the 1 factor becomes the eighth row weights 44; and the $v(j)^2$ factor becomes the ninth row 46 weights.

The $x(i)$, $y(i)$, $v(i)$ values which are the object report data values at time T are directed to the input lines 24 as shown in FIG. 2. Thus, each input value is directed through interconnections 28 so that it is multiplied by the corresponding polynomial factor for all N different system tracks for time T. In this way, each output processing element 26 is able to compute the function Z in equation 1 by summing all of the products of the plot inputs and the system track weights. In an alternative embodiment, the multiplication of the plot input by the system track weight may actually take place in the processing element 26.

In addition, the processing elements 26 perform an additional transfer function such as $fnc=e^{-z}$, or other suitable transfer function. With this transfer function, the output of the processing elements 26 will be larger as z gets smaller. That is, the correlation factors produced by the processing elements 26 will beta maximum when the differences between the plot and system track vectors are a minimum. In a preferred embodiment, all of the data values are positive and all the plot and weight values are normalized.

Thus, for a given object report at time T having data values x(i), y(i), v(i), the CAPT 22 will produce N correlation values from the N processing elements 26. These correlation values each represent a correlation, or a difference, between the object report vector and a system track vector. The goodness of the match, or correlation, between the object report and the system track should be found in the processing element with the largest correlation value, a minimum vector difference, corresponding to the best match.

A preferred method of utilizing the correlation values derived by the CAPT 22 is shown in FIG. 3. In particular, a host processor 48 will perform the five steps as shown in FIG. 3 for each plot vector presented to the CAPT 22. Each plot vector is the multi-dimensional input data defining each object report, which may be, for example, point 16 in FIG. 1. Plot vectors comprise x(i), y(i), v(i) data, and are presented to the CAPT 22 as indicated in FIG. 2 along the input lines 24. In response the CAPT 22 will produce N C(k) correlation values.

In step 1 the host processor 48 will retrieve all of the C(k) values. In step 2 the host will find the largest correlation value, or MAX C(k). This value will be called D(k). In step 3 the host 48 will compare D(k) with the current C(k) in the track correlation file. The track correlation file 50 shown in FIG. 4 consists of a file containing system track numbers in a first column, MAX [C(k)], in the second column, and plot number in the third column. System track number refers to a numerical index of the track value stored as interconnection weights in the CAPT 22. The MAX [C(k)] is the maximum C(k) value to date. Initially, all of the C(k) values in the track correlation file are set to be equal to a minimum value. This provides a minimum threshold which a MAX C(k) must exceed to be entered into the track correlation file. The plot number refers to a numerical index of the plot vectors presented to the CAPT 22. For example, the first plot vector presented may be designated plot vector number 1 and the succeeding plot vectors presented may be given succeeding numerical designations. As shown in the track correlation file 50 there are M plot vectors.

If step 3 determines that D(k) is larger than the C(k) for that track number then step 4 will replace that C(k) with the new D(k) value. For example, as shown in the track correlation file 50 in FIG. 4, plot vector 1 yielded the maximum correlation value from system track number 4, or MAX [C(4)]. If this value exceeded the minimum threshold, then it replaced the initial minimum as the MAX[C(4)]value in the track correlation table 50 and the 1 was placed in the plot number column across from system track 4.

In step 5 the process is repeated for the next plot vector. For example, as shown in FIG. 4, plot vector number 4 yielded a maximum correlation value from system track number 1. It should be noted that as plot vectors are processed, it is possible for a current plot vector to replace a previous plot number in the track correlation 50. That is, the MAX[C(k)] column stores the maximum C(k) value to date. Plot vectors which are replaced may go back to a queue with previously unprocessed plot vectors for later processing in accordance with the 5 steps in FIG. 3. It should be noted that some over-placement may occur. It will be appreciated that the host processing steps illustrated in FIGS. 3 and 4 are particularly adapted to the plot-to-track correlation problem, but could easily be adapted to permit utilization of this CAPT 22 with other related applications.

The CAPT 22 can be implemented using software, hardware or combinations of the two. Highly parallel neural network fixed weight processors exist which can achieve high rates such as 200 million interconnects per second. Using such a processor, the performance of the CAPT can be estimated. Assuming that the step of downloading a weight takes two microseconds (2 µsec.), presenting a plot value takes two microseconds, computing each correlation value takes 45 nanoseconds (9 multiply-accumulates), and retrieving correlation values takes 2 microseconds. For a problem involving 1,000 plot to track correlations, downloading weights then would take 6× 1,000×2 microseconds=12 msec. Presenting 1,000 plot values would take 6×1,000×2 microseconds=12 msec. Processing 1,000 plot values would take 1,000×1,000×45 nsec.=45 msec. Retrieving 1,000×1, 000 C(k)'s would take 1,000×1,000×2 microseconds=2 seconds. Adding time in the host to find MAX[C(k)] would take approximately one additional second assuming one microsecond per C(k). Thus, the total processing time would be 3 seconds to process 1,000 plot-to-track correlations.

In accordance with the foregoing description, it can be seen that the CAPT 22 is able to solve multi-dimensional correlation problems for large numbers of data elements in real-time. Further, the system requires minimal algorithm development, minimal software development and minimal preprocessing. Also, the system can be implemented using current hardware technology at a reasonable cost. While the above description constitutes the preferred embodiments of the present invention, it will be appreciated that the invention is susceptible to modifications, variation and change without departing from the proper scope and fair meaning of the accompanying claims.

What is claimed is:

1. A system for correlating object reports in a first set of multi-dimensional data with object reports in a second set of related multi-dimensional data, said multi-dimensional data including x coordinate position, y coordinate position and velocity, said first set comprising tracking data vectors of predicted object reports at a given time and said second set comprising vectors of sensed object reports at said given time, said system comprising:

host computer for receiving and storing said vectors of predicted object reports and said vectors of sensed object reports;

a plurality of input means for accepting said vectors of sensed object reports in said second set of data from said host computer;

a set of processing elements each producing a correlation output signal that is a difference calculation between said vectors of sensed object reports and said vectors of predicted object reports;

a set of interconnections coupling each of said input means with each of said processing elements, said interconnections each having a fixed strength that is a function of factors of a polynomial for calculating said difference multiplied by said value of said tracking vectors of predicted object reports, said weighted connections to each processing elements also being proportional to one of said tracking vectors in said first set of multi-dimensional data, said processing element multiplying said vectors of said sensed object reports by said interconnection strength; and controller mean for comparing the correlation output signal from said processing elements for each vector of a predicted object report and each vector of a sensed object report and for assigning each of said vectors of object reports in said second set to one of said vectors of object reports in said first set based on the maximum correlation signal produced by a said processing elements, wherein said controller means further comprises a host computer for determining if correlation signals are greater than a minimum threshold before performing said assignment, said host computer also storing said maximum correlation signals and determining if a given correlation produced by an object report from said second set in a given processing element is greater than previous maximum correlation signals produced in said processing element by a different object report in said first set.

2. A method for correlating entities in a first set of multi-dimensional data with entities in a second set of related multi-dimensional data, said entities in the first set comprising tracking data vectors of predicted object reports at a given time and said entities in the second set comprising vectors of sensed object reports at said given time, said method comprising the steps of:

receiving said vectors of sensed object reports in said second set of data in a plurality of input units;

coupling each of said input units to a set of processing elements through a connection having a fixed strength that is a function of factors in a polynomial; using said polynomial to calculate the difference between the vectors of sensed object reports and the vectors of predicted object reports, multiplied by said vectors of predicted object reports, said weighted connection also being proportional to one of said tracking data vectors in said first set of multi-dimensional data;

generating correlation output signals in a plurality of processing elements that are a function of the sensed object report vectors multiplied by said weighted connection;

comparing the correlation output signals from said processing elements for each predicted object report and each sensed object report; and assigning each of said object reports in said second set to one of said object reports in said first set based on said comparison of said correlation signals from said processing elements.

3. The method of claim 2 wherein said step of coupling including the step of determining the polynomial factors:

$$(x(i)-x(j))^2+(y(i)-y(j))^2+(v(i)-v(j))^2$$

where $x(i)$=the x component of the $i^{th}$ object report in the second set, $y(i)$=the y component of the $i^{th}$ object report in the second set, $v(i)$=the v component of the $i^{th}$ object report in the second set, $x(j)$=the x component of the $j^{th}$ object report in the first set, $y(j)$=the y component of the $j^{th}$ object report in the second set, and $v(j)$=the v component of the $j^{th}$ object report in the second set.

4. The method of claim 3 wherein said step of coupling including the step of determining the function $e^{-z}$ where:

$$Z=(x(i)-x(j))^2+(y(i)-y(j))2+(v(i)-v(j))^2.$$

5. The method of claim 2 wherein said step of receiving said object reports includes the step of receiving object report x coordinate position, y coordinate position and velocity.

6. A method for correlating entities in a first set of multi-dimensional data with entities in a second set of related multi-dimensional data, said entities in the first set comprising tracking data vectors of predicted object reports at a given time and said entities in the second set comprising vectors of sensed object reports at said given time, said method comprising the steps of:

receiving said vectors of sensed object reports in said second set of data in a plurality of input units;

coupling each of said input units to a set of processing elements through a connection having a fixed strength that is a function of factors in a polynomial for calculating the difference between the vectors of sensed object reports and the vectors of predicted object reports, multiplied by said vectors of predicted object reports, said weighted connection also being proportional to one of said tracking data vectors in said first set of multi-dimensional data;

generating correlation output signals in a plurality of processing elements that are a function of the sensed object report vectors multiplied by said weighted connection;

comparing the correlation output signals from said processing elements for each predicted object report and each sensed object report; and assigning each of said object reports in said second set to one of said object reports in said first set based on said comparison of said correlation signals from said processing elements, wherein said step of assigning further comprises the step of determining which of said correlation signals are greater than a minimum threshold before performing said assignment, the step of storing said maximal correlation signals and also the step of determining if a given correlation produced by an object report from said second set in a given processing element is greater than previous maximum correlation signals produced in said processing element by a different object report in said first set.

7. A system for correlating object reports in a first set of multi-dimensional data with object reports in a second set of related multi-dimensional data, said multi-dimensional data including x coordinate position, y coordinate position and velocity, said first set comprising tracking data vectors of predicted object reports at a given time and said second set comprising vectors of sensed object reports at said given time, said system comprising:

host computer for receiving and storing said vectors of predicted object reports and said vectors of sensed object reports;

a plurality of input means for accepting said vectors of sensed object reports in said second set of data from said host computer;

a set of processing elements each producing a correlation output signal that is a difference calculation between said vectors of sensed object reports and said vectors of predicted object reports;

a set of interconnections coupling each of said input means with each of said processing elements, said interconnections each having a fixed strength that is a function of factors of a polynomial, said polynomial configured to calculate said difference multiplied by said value of said tracking vectors of predicted object reports, said weighted connections to each processing element also being proportional to one of said tracking vectors in said first set of multi-dimensional data, said processing element multiplying said vectors of said sensed object reports by said interconnection strength; and controller means for comparing the correlation output signal from said processing elements for each vector of a predicted object report and each vector of a sensed object report and for assigning each of said vectors of object reports in said second set to one of said vectors of object reports in said first set based on the maximum correlation signal produced by said processing elements.

8. The system of claim 7 wherein said interconnections have a strength which is a function of the polynomial factors:

$$(x(i)-x(j))^2+(y(i)-y(j))^2+(v(i)-v(j))^2;$$

where $x(i)$=the x component of the $i^{th}$ object report in the second set, $y(i)$=the y component of the $i^{th}$ object report in the second set, $v(i)$=the v component of the $i^{th}$ object report in the second set, $x(j)$=the x component of the $j^{th}$ object report in the first set, $y(j)$=the y component of the $j^{th}$ object report in the second set, and $v(j)$=the v component of the $j^{th}$ object report in the second set.

9. The system of claim 8 wherein said processing elements include a means for producing an output function which includes the function $e^{-z}$ where:

$$Z=(x(i)-x(j))^2+(y(i)-y(j))^2+(v(i)-v(j))^2.$$

* * * * *